US010650695B2

(12) United States Patent
Minen

(10) Patent No.: US 10,650,695 B2
(45) Date of Patent: *May 12, 2020

(54) APPARATUS TO SIMULATE DRIVING A LAND VEHICLE

(71) Applicant: VI-GRADE AG, Romanshorn (CH)

(72) Inventor: Diego Minen, Udine (IT)

(73) Assignee: VI-grade GmbH, Darmstadt (DE)

( * ) Notice: Subject to any disclaimer, the term of this patent is extended or adjusted under 35 U.S.C. 154(b) by 185 days.

This patent is subject to a terminal disclaimer.

(21) Appl. No.: 15/748,253

(22) PCT Filed: Jul. 29, 2016

(86) PCT No.: PCT/EP2016/068208
§ 371 (c)(1),
(2) Date: Jan. 29, 2018

(87) PCT Pub. No.: WO2017/021323
PCT Pub. Date: Feb. 9, 2017

(65) Prior Publication Data
US 2018/0218630 A1    Aug. 2, 2018

(30) Foreign Application Priority Data
Jul. 31, 2015    (IT) .................. 102015000040968

(51) Int. Cl.
*G09B 9/04*    (2006.01)
*G01M 17/007*    (2006.01)
*G06T 11/00*    (2006.01)
*G09B 19/16*    (2006.01)

(52) U.S. Cl.
CPC ............ *G09B 9/04* (2013.01); *G01M 17/007* (2013.01); *G06T 11/00* (2013.01); *G09B 19/167* (2013.01)

(58) Field of Classification Search
USPC .......................... 434/29, 61, 62, 66, 67, 69
See application file for complete search history.

(56) References Cited

U.S. PATENT DOCUMENTS

| 4,838,540 | A | * | 6/1989 | Ouellet | .................. G09B 9/066 434/247 |
| 6,139,324 | A | * | 10/2000 | Roy | .................. G09B 9/00 434/55 |
| 8,961,326 | B2 | * | 2/2015 | Fisher | .................. F16M 11/043 104/112 |

(Continued)

FOREIGN PATENT DOCUMENTS

| DE | 198 02 590 | 8/1999 |
| DE | 10 2011 085 640 | 5/2013 |
| FR | 2 931 237 | 11/2009 |

OTHER PUBLICATIONS

Written Opinion and International Search Report for International application No. PCT/EP2016/068208, dated Oct. 10, 2016; 8 pages.

*Primary Examiner* — Kurt Fernstrom
(74) *Attorney, Agent, or Firm* — Rankin, Hill & Clark LLP

(57) ABSTRACT

Apparatus to simulate driving a land vehicle comprising a fixed base platform (11), a mobile platform (12) disposed above the base platform (11), a drive station (13) associated with the mobile platform (12), and movement means (18) associated with the base platform (11) and with the mobile platform (12) to provide the movement of the mobile platform (12) with respect to the base platform (11).

11 Claims, 6 Drawing Sheets

(56) References Cited

U.S. PATENT DOCUMENTS

| | | | | |
|---|---|---|---|---|
| 9,011,259 | B2* | 4/2015 | Schmidt | A63G 31/16 |
| | | | | 434/29 |
| 9,732,535 | B2* | 8/2017 | Jennings | A63J 5/00 |
| 2005/0042578 | A1* | 2/2005 | Ammon | G09B 9/04 |
| | | | | 434/62 |
| 2007/0269771 | A1* | 11/2007 | Lefton | G09B 9/14 |
| | | | | 434/29 |
| 2010/0273132 | A1* | 10/2010 | Dutt | G09B 9/14 |
| | | | | 434/29 |
| 2013/0157227 | A1* | 6/2013 | Jansen | G09B 9/14 |
| | | | | 434/30 |
| 2015/0030999 | A1* | 1/2015 | Lee | A63G 31/16 |
| | | | | 434/62 |
| 2016/0140861 | A1* | 5/2016 | Tischer | A63G 31/16 |
| | | | | 434/69 |

* cited by examiner

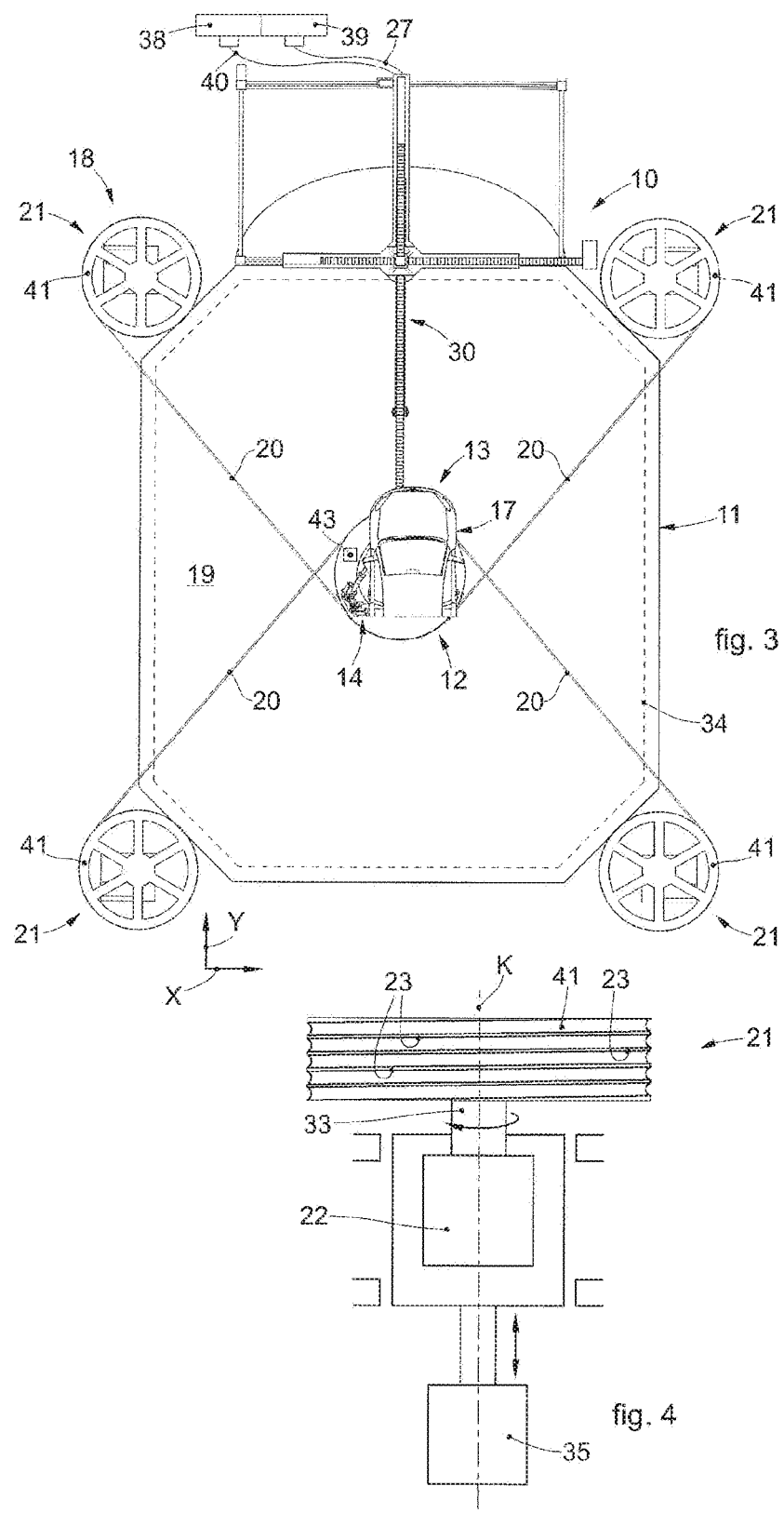

APPARATUS TO SIMULATE DRIVING A LAND VEHICLE

FIELD OF THE INVENTION

The present invention concerns an apparatus to simulate driving a land vehicle such as a car, a sports car, a bus, a truck or suchlike.

In particular, the apparatus is able to reproduce the driving conditions of one of the above vehicles along predetermined routes and with the driving modes as determined by the driver.

The present invention can also be used for training staff to drive.

BACKGROUND OF THE INVENTION

Apparatuses are known for simulating driving land vehicles, which comprise a main frame to which a seating element for the driver, command means that can be actuated by the user, such as a steering wheel, brake, clutch and accelerator pedals, and a projection screen onto which the driving environment is projected in which the driver is immersed during the simulation are associated.

The frame can be selectively moved by a mechanical kinematism which comprises a plurality of telescopic actuators, constrained to the frame and to a fixed support base, to define a kinematic and hexapod structure. The actuators move the frame in space both by translating it along the three coordinate axes, and also by providing rotations around said axes. In other words, the frame can be moved in all its six degrees of freedom.

These types of known simulation apparatuses mostly derive from aeronautical applications and are not very suitable for the simulation of land vehicles. This is because their performance is very limited and the reproduction of the driving sensations experienced by the driver of a land vehicle is not very faithful. These disadvantages are due to the fact that the movements of a land vehicle require the spatial kinematism, for example the hexapod type, to develop high accelerations to simulate the yawing and the longitudinal and lateral translations.

The structural conformation of this known simulation apparatus is therefore not optimized for the actions it has to effect. It must also be added that known simulation apparatuses are extremely bulky in order to compensate said limits.

Simulation apparatuses are also known which comprise a mobile base translatable along guides disposed transverse to each other, and which allow to move the mobile base on a plane. The frame is installed on the mobile base, and can be moved by a hexapod type kinematism as described above.

These known simulation apparatuses, although they are developed to simulate driving land vehicles, are also very bulky, difficult to make and to manage, and very expensive.

An apparatus to simulate driving a land vehicle is also known, for example described in WO-A-2013/114179, which comprises a mobile platform and a fixed platform having a flat surface on which the mobile platform is positioned resting and sliding thereon. In particular, linear actuators are connected to the fixed platform and the mobile platform to determine a sliding movement of the latter on the fixed platform.

Apparatuses are also known for carrying out mechanical tests on motor vehicles, described for example in FR-A-2.931.237, apparatuses for carrying out aerodynamic tests on motor vehicles, one of which is described for example in US-A-2015/0000392, and apparatuses for carrying out impact tests on motor vehicles, one of which is described in DE-A-198.02.590. However, these apparatuses cannot be used for simulating the driving of land vehicles because they are not able to generate displacements of the vehicle such as to induce in the driver actions sufficient to simulate the acceleration/deceleration of a vehicle in all the directions of movement of said vehicle. In fact, due to their structural conformation, these apparatuses are not able to generate displacements in two coordinated directions on a plane and rotations around an axis orthogonal to the movement plane in order to simulate the actions of rolling, yawing, pitching and accelerations/decelerations that normally affect a motor vehicle.

One purpose of the present invention is to obtain an apparatus to simulate driving a land vehicle.

Another purpose of the present invention is to obtain an apparatus to simulate driving a land vehicle which allows to increase the time the driver is exposed to accelerations and hence to provide a more realistic simulation of the inertia environment to which the driver is subjected during driving.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, an apparatus to simulate driving a land vehicle comprises a fixed base platform provided with a flat support surface, a mobile platform disposed above the base platform, sliding means associated with the mobile platform and configured to allow the mobile platform to slide on the support surface, a drive station associated with the mobile platform, and movement means.

The movement means are associated with the base platform and with the mobile platform to allow the mobile platform the translation on the support surface in a first direction and a second direction, coordinated with the first direction, and at least one rotation around a third direction normal with respect to the support surface and coordinated with respect to the first direction and the second direction.

According to one aspect of the present invention, the movement means comprise a plurality of cables connected with a first end to the mobile platform and with a second end, opposite the first end, to respective actuation members.

The actuation members are configured to move the cables and to vary the distance between the connection zone of each cable to the mobile platform and the connection zone of each cable to the actuation members, and to thus determine a movement of the mobile platform with respect to the base platform.

The presence of cables allows to increase, compared with known solutions, the movement travels, and also the amplitude of yawing rotation, to which the mobile platform can be subjected and, therefore, to increase the time a driver is exposed to the inertia loads with accelerations of varying degrees. In this way, the simulation apparatus adapts to the reaction times of the driver to actuate sudden actions in unstable conditions of the vehicle and/or actions of the control system.

The present invention also concerns a method to simulate driving a land vehicle which comprises the movement of the mobile platform, on a flat support surface of the fixed base platform, by the movement means.

The movement provides to make the mobile platform slide, by means of sliding means, on the support surface, making it translate in a first direction and a second direction, coordinated with the first direction, and to rotate around a third direction, normal with respect to the support surface and coordinated with respect to the first direction and the second direction.

According to one aspect of the invention, the movement provides to drive the plurality of actuation members to move the cables and to vary the distance between the connection zone of each cable to the mobile platform and the connection zone of each cable to the actuation members, and to determine, therefore, a movement of the mobile platform with respect to the base platform.

BRIEF DESCRIPTION OF THE DRAWINGS

These and other characteristics of the present invention will become apparent from the following description of some embodiments, given as a non-restrictive example with reference to the attached drawings wherein:

FIG. 3 is a plan view of FIG. 1;

FIG. 4 is a detailed view of a component of the simulation apparatus;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
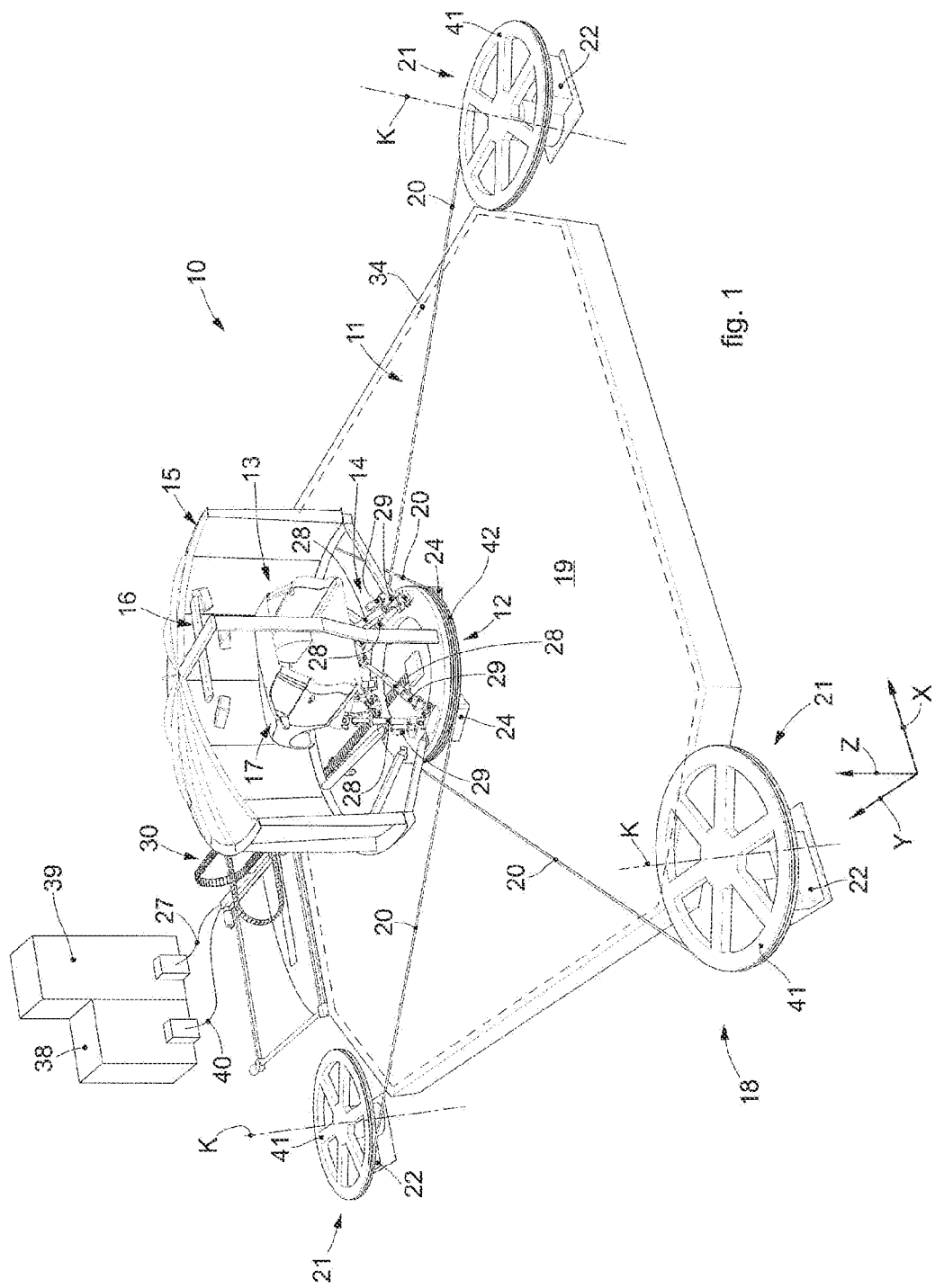
FIG. 1 is a perspective view of an apparatus to simulate the driving of a land vehicle.
Figure 2:
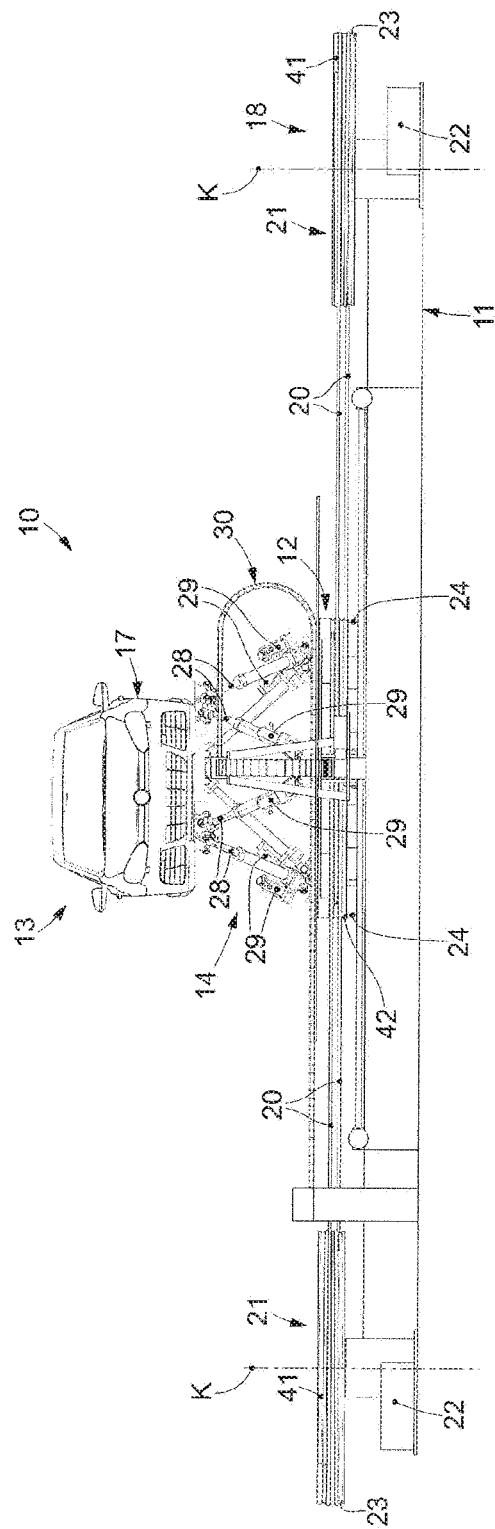
FIG. 2 is a front view of part of the apparatus in FIG. 1.

With reference to FIGS. 1 and 2, an apparatus to simulate driving a land vehicle, according to the present invention, is indicated in its entirety by the reference number 10, and comprises a fixed base platform 11, a mobile platform 12, and a drive station 13 that is associated with the mobile platform 12.

The mobile platform 12 is positioned and selectively movable, as described hereafter, on the base platform 11.

The drive station 13 (FIGS. 1-3) comprises a frame 17, or body, that at least partly reproduces the cabin of the land vehicle.

A seat and command means for the driver, such as a steering wheel, pedals, and a dashboard with instruments, not shown in the drawings, can be present in the cabin defined by the frame 17.

Merely by way of example, the base platform 11 has a substantially rectangular shape. However, it cannot be excluded that in other embodiments, the base platform 11 has different shapes and sizes, for example polygonal, circular or a combination of curved and polygonal.

The base platform 11 is provided with a flat support surface 19 on which the mobile platform 12 is moved.

The support surface 19 defines a movement space 34 that delimits the space inside which the mobile platform 12 can move. The support surface 19, and the movement space 34 defined by it has a plan surface extension that is bigger than the plan sizes of the mobile platform 12.

The support surface 19 is suitably finished, for example, by grinding and polishing, to make it extremely smooth and to allow the mobile platform 12 to slide upon it.

The particular finishing of the support surface 19 prevents any undesired vibrations occurring in the mobile platform 12 during its movement on the base platform 11.

Movement means 18 are associated with the base platform 11 and the mobile platform 12 to move the latter on the base platform 11.

The movement means 18 allow both the translation of the mobile platform 12 on the support surface 19, that is, in a first direction X, and a second direction Y, coordinated with the first direction X, and also its rotation around an axis parallel to a third direction Z which is coordinated with the first direction X and with the second direction Y, that is, orthogonal to the support surface 19. The rotation of the mobile platform 12 around the third direction Z allows to simulate the yawing of a vehicle.

It is quite evident that, combining the movements in the first direction X and the second direction Y, it is possible to move the base platform 11 in other directions as well, said directions lying on the plane of the support surface 19.

With the movement means 18 it is therefore possible to control three of the six overall degrees of freedom of the mobile platform 12.

According to the present invention, the movement means 18 comprise a plurality of cables 20 connected with a first end to the mobile platform 12 and with a second end, opposite the first end, to respective actuation members 21 configured to move the cables 20 and to vary the distance between the connection zone of the cable 20 to the mobile platform 12 and the connection zone of the cable 20 to the actuation members 21, and to determine a movement of the mobile platform 12 with respect to the base platform 11.

According to some embodiments, each cable 20 can be connected with a first end to the mobile platform 12 and with a second end, opposite the first end, to the actuation member 21. This solution allows to limit the overall lengths of the cables 20 and prevents them from interfering with movements of the mobile platform 12 or the actuation members 21.

According to another aspect of the present invention, the actuation members 21 are installed in a fixed position with respect to the base platform 11, for example they can be installed on the base platform 11, for example at the margins of the latter as shown in the drawings, or on fixed structures outside the base platform 11.

Merely by way of example, it can be provided that the actuation members 21 are installed on the base platform 11 outside the movement space 34.

According to the embodiment in FIG. 1, the actuation members 21 are installed on the base platform 11 and, by actuating them, keep the respective cable 20 associated with them tensed so as to guarantee that the mobile platform 12 is positioned, and maintained in position, with respect to the base platform 11.

Merely by way of example, the actuation members 21 are commanded so that each cable 20 is tensed by an appropriate force. Merely by way of example, the cable 20 is tensed so that, during use, it is subjected to a minimum deflection, that is, an inflexion such as to prevent any contact of the cable 20 with the base platform 11.

According to possible solutions, the movement means 18 comprise four actuation members 21 disposed distanced from each other, for example in a pattern at the tops of a rectangle, that is, disposed at 90° with respect to each other.

The presence of four actuation members 21 allows to obtain a redundancy of degrees of freedom suitable to keep the cables 20 always in a tensed condition and hence to prevent them from slackening to such an extent that they do not ensure control of the position of the mobile platform 12 with respect to the base platform 11.

The mobile platform 12 is provided with a connection body 42 in correspondence with which the cables 20 are connected.

The cables 20 can connect to the connection body 42 by means of pegs, pins, brackets, jacks or possible combinations thereof.

According to a possible formulation of the present invention, the connection body 42 is discoid in shape and during use the cables 20 partly wind/unwind on its external circumferential surface.

Figure 5:
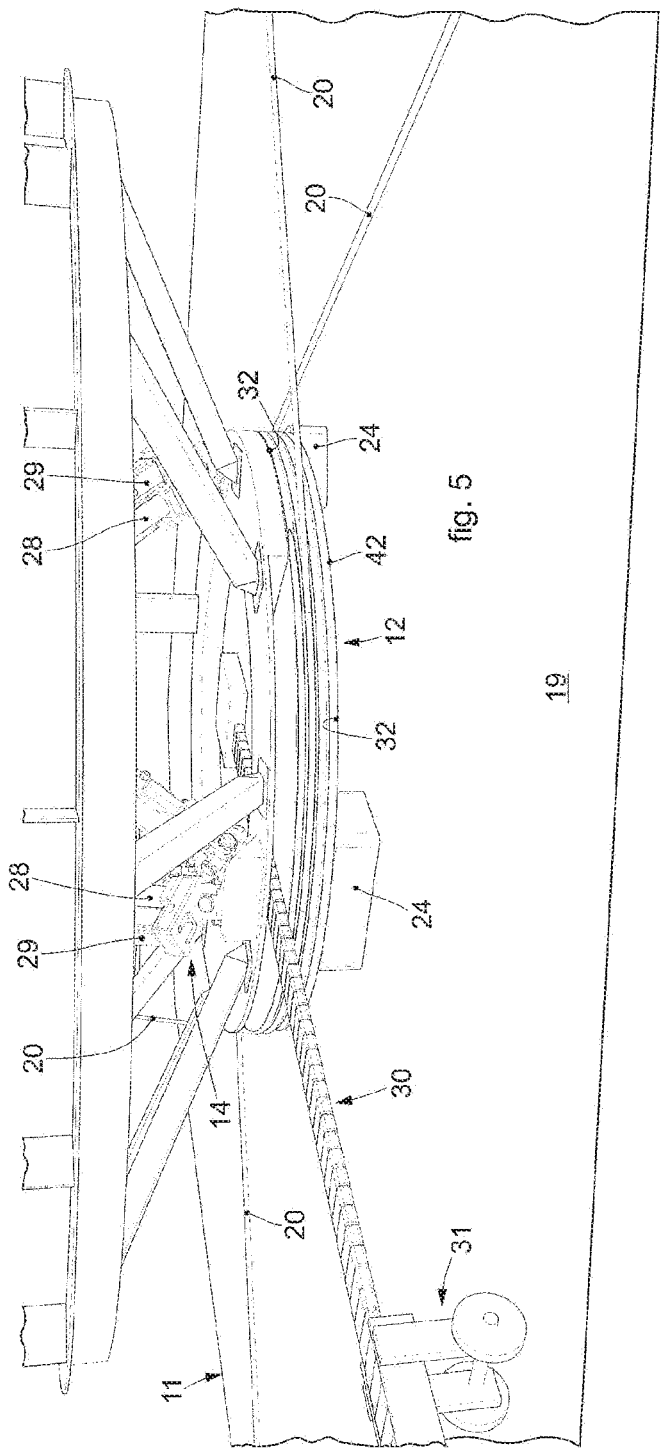
FIG. 5 is an enlarged detail view of the simulation apparatus in FIG. 1.

According to the solution shown in FIG. 5, the connection body 42 is provided with a plurality of guides 32 made on its circumferential surface and in each of which one of the cables 20 winds/unwinds. The circumferential surface of the connection body 42 develops substantially orthogonal to the support surface 19 of the base platform 11.

The guides 32 can have a substantially circular configuration, that is, each is made substantially parallel to the support surface 19, and the cable 20 winds on it. The circular configuration of the guides 32 ensures that during the movement of the mobile platform 12, that is, when the cables 20 are wound/unwound on the guides 32, there is no variation in the position in height of the cable 20 with respect to the base platform 11.

Each actuation member 21 (FIG. 4) comprises a pulley 41 connected to a motor 22 configured to make the pulley 41 rotate around its axis of rotation K. The cable 20 is connected to the pulley 41 so that when the motor 22 is driven it is possible to determine the winding or unwinding of the cable 20 on the pulley 41 and consequently the movement of the mobile platform 12 on the base platform 11.

According to one formulation of the present invention, the axis of rotation K of the pulley 41 is orthogonal to the support surface 19, thus allowing to keep the cables 20 substantially parallel to the support surface 19.

When the actuation members 21 are driven, if the first end of one of the cables 20 is unwound from the pulley 41, the other end winds onto the connection body 42, thus guaranteeing the cable 20 is tensed.

The motor 22 can be chosen from a group comprising an electric motor, a hydraulic motor or a pneumatic motor.

Each pulley 41 is provided with at least one guide 23 with a helical development in which the cable 20 is positioned during the winding/unwinding action. The guide 23 can have a helical development so as to prevent any overlapping of several coils of cable 20 during the actuation of the pulley 41. Merely by way of example, the guide 23 is provided with two or more coils around which the cable 20 winds for two or more turns.

Between the motor 22 and the pulley 41 a reducer member 33 (FIG. 4) can be interposed, configured to reduce the speed of rotation imparted by the motor 22 to the pulley 41.

According to possible embodiments, for example shown in FIG. 4, a movement member 35 is connected to each actuation member 21, and is configured to move the actuation member 21 in a direction parallel to the axis of rotation of the pulley 41 to keep the cables 20 substantially parallel to the base platform 11, that is, the support surface 19 of the base platform 11. In fact, if the guides 23 of the pulleys 41 have a helical development, the movement member 35 moves the pulleys 41 axially so as to dispose the cables 20 always parallel to the support surface 19, also during the winding and unwinding of the cables 20 on the pulleys 41.

Moreover, the movement member 35 allows to keep each cable 20 substantially parallel to the corresponding guide 32 made in the connection body 42 and in which the cable 20 is positioned.

According to possible solutions, the movement member 35 can comprise a jack screw, a linear actuator, or a motor.

Merely by way of example, the movement member 35 comprises a ball bearing jack that precisely controls the movement of the pulley 41 as a function of the movements that are imparted to the mobile platform 12.

Sliding means 24 are associated with the mobile platform 12, configured to allow the sliding of the mobile platform 12 on the support surface 19 of the base platform 11.

With reference to FIGS. 7-10, the mobile platform 12 can move in directions X, Y, and rotate around axis Z, according to the unwinding or winding of the cable 20 on the pulleys 41, and the simultaneous winding or unwinding of the cable 20 on the connection body 42.

The mobile platform 12 is provided in this case with at least three sliding means 24 disposed equidistant on the external perimeter of the mobile platform 12 in order to support it.

The sliding means 24 keep the mobile platform 12 suspended, that is, resting on the base platform 11, avoiding having to use mechanical sliding means such as, for example, sliding guides and blocks sliding on the sliding guides.

The sliding means 24 in this case comprise pneumostatic blocks 25 (FIGS. 5 and 6) which are disposed recessed in the thickness of the mobile platform 12.

The pneumostatic blocks 25 are associated with spherical pins 26 that allow to adapt them to the load conditions that they have to support in order to keep the mobile platform 12 parallel to the base platform 11.

Figure 6:
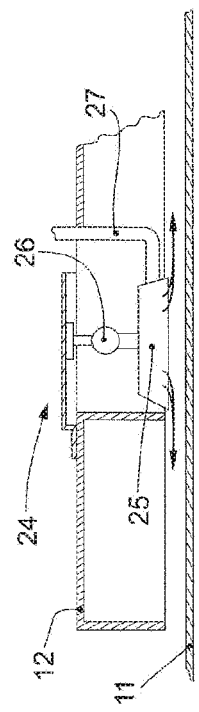
FIG. 6 is a schematic section view of a component of the simulation apparatus in FIG. 1.
Figure 7:
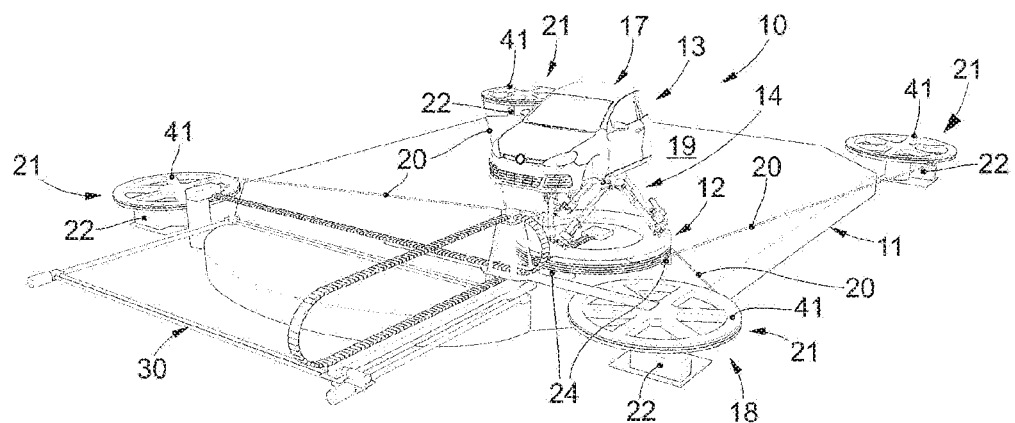
FIGS. 7-10 are perspective views of a simulation apparatus in different operating positions.
Figure 8:
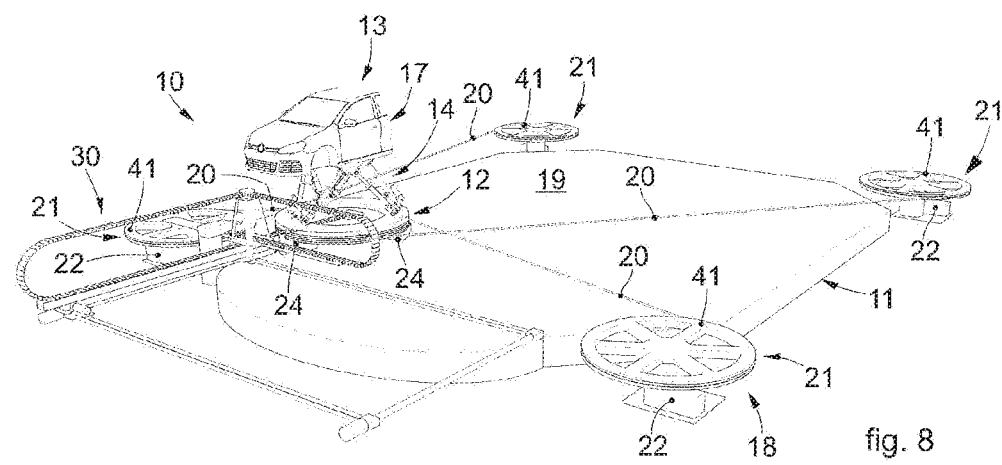
Figure 9:
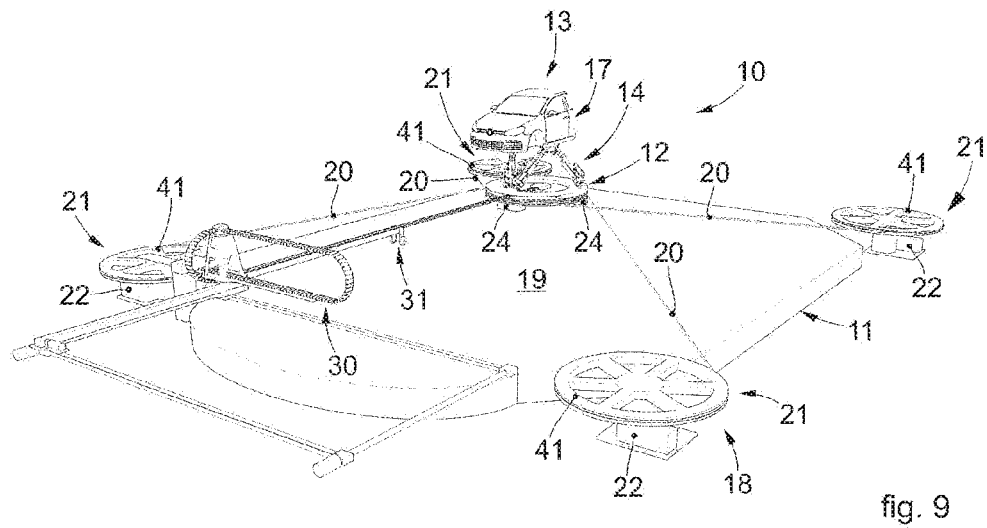
Figure 10:
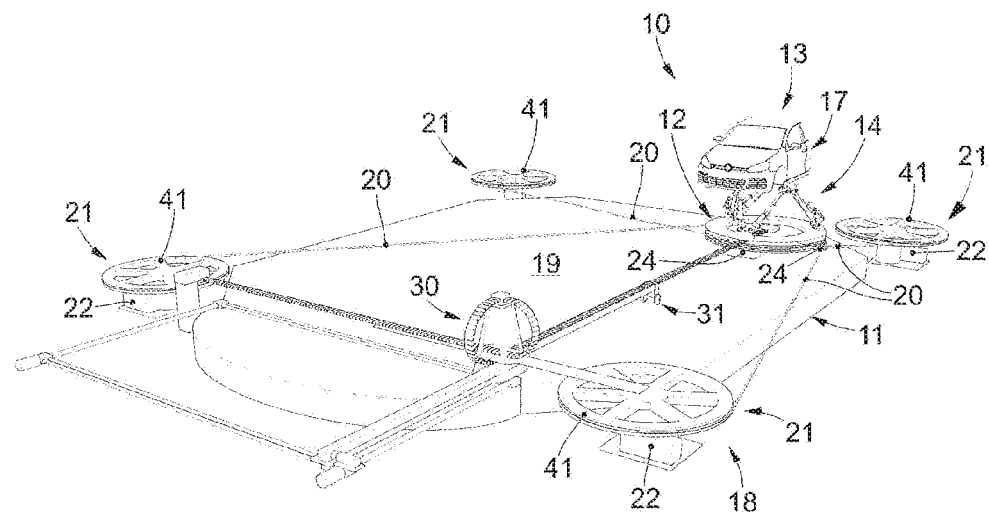

A flexible pipe 27 feeds the pneumostatic blocks 25 with compressed air generated by a compressed air generator 39 (FIGS. 1 and 6).

The compressed air, fed from the compressed air generator 39, is made to emerge continuously through the pneumostatic blocks 25 and lifts the mobile platform 12 from the base platform 11, facilitating the sliding thereof.

In other embodiments, it can be provided that the sliding means 24 comprise mechanical type elements such as ball bearings.

According to variant embodiments, the sliding means 24 can comprise magnetic type elements such as magnetic suspension bearings. This solution reduces the design complexity of the sliding means 24 and avoids the presence of reciprocally sliding mechanical parts.

According to some embodiments shown in FIGS. 1-6, the frame 17 is installed on the mobile platform 12 by means of a kinematic mechanism 14 that allows to move the frame 17 with respect to the mobile platform 12.

In this case, the kinematic mechanism 14 comprises a hexapod architecture, that is, provided with six linear actuators 28 of the ball bearing type and actuated by respective electric motors 29.

The linear actuators 28 therefore move the frame 17 in all six of its degrees of freedom and it is therefore possible to compensate the movements that are not provided with the movement means 18.

The three movements managed by the linear actuators 28, in the real solutions attributed to the kinematics of suspensions of the vehicles, allow to simulate pitching and rolling and vertical movement.

It is quite clear that with the linear actuators 28 it is possible to simulate, although with lower margins of maneuvering, the movements simulated by actuating the movement means 18.

The kinematic mechanism 14 is therefore able to compensate movement along the remaining three degrees of freedom which were not provided by the movement means 18 and to superimpose three more redundant degrees of freedom that allow to optimize the movements of the apparatus 10.

The redundancy of said degrees of freedom, and hence the provision of a hexapod type configuration of the mechanical kinematism 14, allow to divide the translation movements in the first direction X and the second direction Y, and the rotation movement around the third direction Z of the mobile platform 12 as a function of their characteristic frequency. In this way, the rapid movements are performed by the kinematic mechanism 14 and the slow movements by the movement means 18, thus allowing to compensate the non-physical translation accelerations in the first direction X, the second direction Y, and the rotation around the third direction Z due to the return of the mobile platform 12 to a neutral position.

The drive combination of the kinematic mechanism 14 and the movement means 18 is able to induce on the driver translational accelerations in two directions and rotational accelerations able to induce on the driver inertial loads such as to activate his vestibular apparatus and in this way obtain a sensation of actually driving a land vehicle.

According to one possible solution, a device 44 to damp vibrations can be associated with the mobile platform 12, configured to annul the oscillations induced by the cables 20 on the mobile platform 12.

This allows to annul the high oscillation frequencies to which the cables 20 can be subjected because of their very nature, and which can negatively affect the perception of high-frequency movement induced at least by the kinematic mechanism 14.

The device 44 to damp vibrations can comprise at least a damping mass 45 and actuation members 46 configured to move the damping mass 45 with respect to the mobile platform 12 and to induce on the latter inertial stresses such as to eliminate the oscillations of the mobile platform 12.

The combination of the damping mass 45 and the respective actuation members 46 allows to generate respective groups, or systems, of mass-spring-damper, wherein said groups act in different directions, and suitable to damp the oscillations to which the mobile platform 12 can be subjected due to the effect of the vibration of the cables 20.

According to a possible solution, the actuation members 46 are configured to allow a translation of the damping mass 45 in two coordinated directions substantially parallel to the support surface 19 and to allow a rotation of the damping mass 45 around a third direction coordinated with the first two. In this way a device 44 to damp vibrations is obtained that is able to damp the vibrations according to three degrees of freedom.

Figure 11:
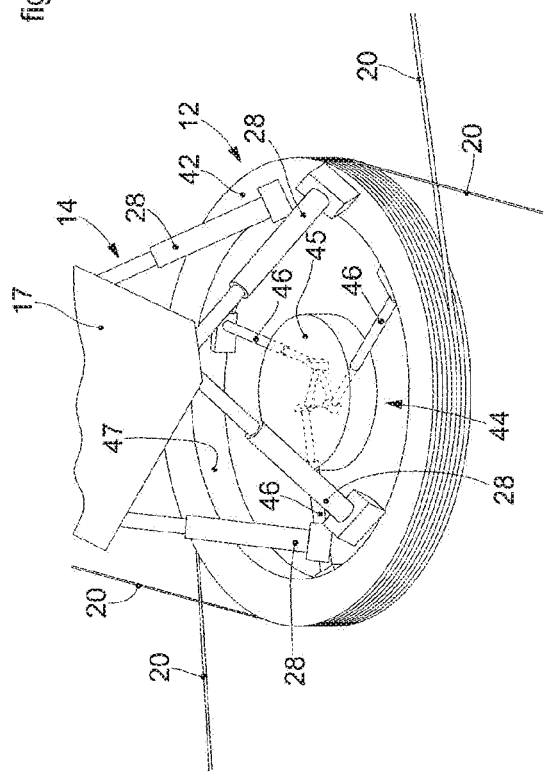
FIG. 11 is a view of an enlarged detail of a simulation apparatus according to the present invention.

According to the embodiment shown in FIG. 11, the actuation members 45 are disposed during use substantially parallel to the support surface 19 and are reciprocally distanced from each other.

According to a possible solution, the device 44 to damp vibrations comprises at least three actuation members 46 disposed angularly distanced from each other, for example by 120° with respect to each other, to allow the translations on the plane and the rotation around an axis orthogonal to the plane.

According to the embodiment shown in FIG. 11, the actuation members 46 can comprise linear actuators whose axes of action are positioned parallel to the support surface 19.

According to another embodiment, the device 44 to damp vibrations can be installed in a cavity 47 made in the mobile platform 12, advantageously in a baricentric position of the latter, in order to optimize the damping actions of the vibrations in the various directions.

The device 44 to damp vibrations can be managed by a control unit configured to compare, substantially continuously, the instantaneous movements of the mobile platform 12 with the target movements, that is the set movements, and consequently to act to guarantee clean target stresses that can be perceived in the guide station 13, for example with a frequency above 40 Hz.

In this way, instantaneous corrections are obtained on the processing algorithms of the drives, based for example on the detection of the position of the mobile platform 12.

The apparatus 10 also comprises support devices 30 to support, during the movements of the mobile platform 12, at least one of either the flexible pipes 27 that feed compressed air to the pneumostatic blocks 25 and the electric conductors 40 which, from a zone outside the base platform 11 are made available to the mobile platform 12 to supply the necessary electric power and/or to transmit control and detection signals that will be described hereafter.

In particular, the flexible pipes 27 and the pneumostatic blocks 25 are connected to the mobile platform 12 in correspondence with the center of the latter so as to support the rotation of the latter around the direction Z and to prevent the winding of the flexible pipes 27 and the electric conductors 40 on themselves.

The support devices 30 can comprise conveyor channels in which the flexible pipes 27 and the electric conductors 40 are positioned.

The support devices 30 can also comprise sliding elements 31 to follow the mobile platform 12 during its movement.

In one embodiment shown in FIG. 1, on the mobile platform 12, a projection screen 15 and video projection devices 16 can be installed, configured to project onto the projection screen 15 images relating to the environment in which the driver is immersed during the driving simulation.

The projection screen 15 can be shaped like a semispherical shell into which the substantial part of the frame 17 is inserted, so that the line of vision of the driver sitting in the cabin of the frame 17 is completely inside the projection screen 15.

In another variant, not shown, the projection screen can be integrated in the frame 17, for example in correspondence with a windscreen, windows and/or mirrors of the body of the vehicle.

Sound reproduction devices are also associated with the projection screen 15 and possibly with the video projection device 16, and are able to reproduce with high fidelity the sounds of the vehicle during driving. Both the video projection device 16 and the sound reproduction device can be managed by processing and control devices to coordinate the reproduction of both images and sounds in relation to the driving modes set by the driver.

A processing and control device 38 controls the independent or synchronized actuation of the motors 22, 29 associated respectively with the actuation members 21 and the linear actuators 28.

The processing and control device 38 implements mathematic algorithms, also known as motion cueing algorithms, which allow to render the functioning of the apparatus 10 as realistic as possible, when it is being driven by an operator.

In particular, the mathematic algorithms not only offer the driver a faithful reproduction of the driving condition but are also studied to suitably determine the movements for the repositioning of the mobile platform 12 in its neutral position and the movements to compensate for unwanted positioning errors due to the lack of elasticity of the cables 20.

The apparatus 10 according to the present invention comprises at least one position sensor 43 (FIG. 3) configured to detect the position of the mobile platform 12 with respect to the base platform 11, that is, with respect to a point of reference of the base platform 11.

The at least one position sensor 43 can be chosen from a group comprising laser sensors, optical encoders, capacitive sensors, electromagnetic sensors or similar and comparable sensors suitable for the purpose.

The position sensor 43 can be installed on the mobile platform 12, as shown in FIG. 3, or in a fixed position with respect to the base platform 11 and can detect the movements of the mobile platform 12.

The position sensor 43 is connected to the processing and control device 38 which, according to the commands imparted at least to the actuation members 21, is able to determine if the actual position reached by the mobile platform 12 corresponds to the position previously calculated for the actuation of the actuation members 21.

In this way, the processing and control device 38 can implement corrective actions both on the actuation modes of the actuation members 21, and also on the subsequent repositioning of the mobile platform 12. This control action allows to compensate for possible disturbance components that can comprise, for example, the flexibility of the cables 20, the deformation of the cables 20, the deformations to which the mobile platform 12 can be subjected, and possible sliding of the cables 20 on the pulleys 41 and/or on the connection body 42.

According to other formulations of the present invention, position detection means, not shown in the drawings, can also be associated with the actuation members 21 and/or the linear actuators 28, and allow to perform a control of the actuation members 21 and/or the linear actuators 28, to optimize their movements and to supply further information to optimize the motion cueing process.

The processing and control device 38 can implement a method to simulate the driving of a land vehicle which comprises at least a detection of the instantaneous position assumed by the mobile platform 12 on the base platform 11, a detection of the instantaneous positions of at least one of either the actuation members 21 or the motors 29 of the kinematic mechanism 14.

By means of these detections it is possible to evaluate if the actuation members 21 and/or the motors 29 are already in an end-of-travel condition or if they can still impart a determinate movement for subsequent simulations.

For example, during the movement of the mobile platform 12, the latter could be taken to a position outside the movement space available on the base platform 11.

The method also provides to receive signals that are supplied by the driver by means of the commands provided in the frame 17, for example a turn of the steering wheel, an acceleration, a deceleration, braking, gear change, or similar or comparable commands.

The method according to the present invention then provides the processing of said signals to determine the speeds, accelerations, rotations that have to be imparted to the mobile platform 12 in order to satisfy at least the simulation conditions set by the driver, that is, to make the mobile platform 12 reach a determinate position and orientation on the base platform 11 with a desired speed or acceleration.

The method according to the present invention then comprises a determination of command signals to be imparted at least to the actuation members 21, and possibly also to the kinematic mechanism 14, so that the mobile platform 12 and possibly the frame 17 are moved with the conditions of speed, accelerations and rotations as determined above.

The method provides that, during the movement of the mobile platform 12, there is a substantially continuous control of the position of the latter with respect to the base platform 11, so that it is possible to evaluate possible errors that can arise, due to the disturbance components identified above.

During the movement of the mobile platform 12, the method according to the present invention can also comprise a continuous detection of the twist torques applied at least to the pulleys 41. This detection allows to ensure a correct tension of the cables 20 and that the conditions of speed and acceleration set for the mobile platform 12 are reached.

According to a possible solution, the detection of the twist torques applied to the pulleys 41 can be effected by detecting the electric power currents of the motors 22.

The method according to the present invention can also comprise determining movements of the kinematic mechanism 14 described above by activating the linear actuators 28. The actuations of the kinematic mechanism 14 can be controlled and coordinated with the actuations of the actuation members 21 of the mobile platform 12.

For example, the actuation of the kinematic mechanism 14 can be commanded to compensate for possible high latency times that are necessary for moving the mobile platform 12.

The combined effect of actuating the actuation members 21 and the kinematic mechanism 14 allows to obtain minimum latency times, thus guaranteeing high congruency with reality.

It is clear that modifications and/or additions of parts may be made to the simulation method and apparatus 10 as described heretofore, without departing from the field and scope of the present invention.

According to a possible variant, for example, it can be provided that two or more cables 20 are associated with each actuation member 21, and develop parallel to each other and connect to the mobile platform 12. This solution allows to generate on each cable 20 slightly different vibration frequencies which, overlapping, can cancel each other out.

It is also clear that, although the present invention has been described with reference to some specific examples, a person of skill in the art shall certainly be able to achieve many other equivalent forms of simulation method and apparatus 10, having the characteristics as set forth in the claims and hence all coming within the field of protection defined thereby.

The invention claimed is:

1. Apparatus to simulate driving a land vehicle comprising a fixed base platform provided with a flat support surface, a mobile platform disposed above said base platform, sliding means associated with the mobile platform and configured to allow said mobile platform to slide on said support surface, a drive station associated with the mobile platform, and movement means associated with the base platform and with the mobile platform to allow the translation of said mobile platform on said support surface in a first direction and a second direction coordinated with the first direction, and at least a rotation around a third direction normal with respect to said support surface and coordinated with respect to the first direction and the second direction, wherein said movement means comprise a plurality of cables connected with a first end to said mobile platform and with a second end, opposite the first end, to respective actuation members configured to move said cables and to vary the distance between the connection zone of each cable to said mobile platform and the connection zone of each cable to said actuation members and to determine a movement of said mobile platform with respect to said base platform.

2. Apparatus as in claim 1, wherein said actuation members are installed in a fixed position with respect to said base platform.

3. Apparatus as in claim 1, wherein said support surface has a plan surface extension greater than the plan sizes of said mobile platform and defines a movement space for said mobile platform.

4. Apparatus as in claim 3, wherein said actuation members are installed outside said movement space.

5. Apparatus as in claim 1, wherein said movement means comprise four actuation members disposed distanced from each other according to a pattern at the tops of a rectangle.

6. Apparatus as in claim 1, wherein said mobile platform is provided with a connection body in correspondence with which said cables connect, and wherein said connection body has a discoidal shape and said cables partly wind/unwind during use on its circumferential external surface.

7. Apparatus as in claim 6, wherein said connection body is provided with a plurality of guides made on its circumferential surface and in each of which one of the cables winds/unwinds.

8. Apparatus as in claim 1, wherein each actuation member comprises a pulley connected to a motor configured to make the pulley rotate around its axis of rotation, and wherein said cable is connected to said pulley.

9. Apparatus as in claim 8, wherein a movement member is connected to each actuation member and is configured to move said actuation member in a direction parallel to the axis of rotation of said pulley in order to keep said cables substantially parallel to the base platform.

10. Apparatus as in claim 1, wherein a device to damp vibrations is associated with said mobile platform and is configured to annul the oscillations induced by said cables on said mobile platform.

11. Method to simulate driving a land vehicle which comprises the movement of a mobile platform, provided with a drive station, on a flat support surface of a fixed base platform by means of movement means associated with the base platform and with the mobile platform, said movement providing to make said mobile platform slide, by means of sliding means, on said support surface, making it translate in a first direction and a second direction coordinated with the first direction, and to rotate around a third direction normal with respect to said support surface and coordinated with the first direction and the second direction, wherein said movement provides to drive a plurality of actuation members associated with a plurality of cables connected with a first end to said mobile platform and with a second end, opposite the first end, to said actuation members, the drive of said actuation members determining the variation in the distance between the connection zone of each cable to said mobile platform and the connection zone of each cable to said actuation members, and determining the movement of said mobile platform with respect to said base platform.

* * * * *